US010232777B2

(12) United States Patent
de Groen et al.

(10) Patent No.: US 10,232,777 B2
(45) Date of Patent: Mar. 19, 2019

(54) MIRROR ADJUSTMENT MECHANISM, IN PARTICULAR FOR A WING MIRROR FOR A MOTOR VEHICLE

(71) Applicant: MCi (Mirror Controls International) Netherlands B.V., Woerden (NL)

(72) Inventors: Amee Heleen de Groen, Woerden (NL); Jan Christiaan Gentis, Woerden (NL); Peter Alexander Hamming, Woerden (NL); Paulus Gerardus Maria van Stiphout, Woerden (NL); Bastiaan Aaldert Smilde, Woerden (NL)

(73) Assignee: MCi (Mirror Controls International) Netherlands B.V., Woerden (NL)

( * ) Notice: Subject to any disclaimer, the term of this patent is extended or adjusted under 35 U.S.C. 154(b) by 124 days.

(21) Appl. No.: 15/117,135

(22) PCT Filed: Feb. 27, 2015

(86) PCT No.: PCT/NL2015/050121
§ 371 (c)(1),
(2) Date: Aug. 5, 2016

(87) PCT Pub. No.: WO2015/130170
PCT Pub. Date: Sep. 3, 2015

(65) Prior Publication Data
US 2017/0167561 A1 Jun. 15, 2017

(30) Foreign Application Priority Data
Feb. 28, 2014 (NL) ...................................... 2012333

(51) Int. Cl.
*B60R 1/072* (2006.01)
*B60R 1/00* (2006.01)
(Continued)

(52) U.S. Cl.
CPC .............. *B60R 1/072* (2013.01); *B60R 1/006* (2013.01); *B60R 1/06* (2013.01); *B60R 1/066* (2013.01);
(Continued)

(58) Field of Classification Search
CPC .. B60R 1/006; B60R 1/02; B60R 1/06; B60R 1/062; B60R 1/0625; B60R 1/064;
(Continued)

(56) References Cited

U.S. PATENT DOCUMENTS 4,497,465 A  2/1985  Yeakley
4,585,200 A  4/1986  Fisher
(Continued)

FOREIGN PATENT DOCUMENTS

CN  102053324  5/2011
CN  102448684  5/2012
(Continued)

OTHER PUBLICATIONS

International Search Report and Office Action from PCT/CN2013/800468034 dated Nov. 6, 2015.
(Continued)

*Primary Examiner* — Nicholas R. Pasko
(74) *Attorney, Agent, or Firm* — Adsero IP

(57) ABSTRACT

A mirror adjustment mechanism, in particular for a wing mirror for a motor vehicle, having a base part with a mirror support arranged pivotally relative thereto, wherein between the base part and the mirror support a damper is arranged, the damper including a collar portion coupled to the mirror support, encompassing a ball portion, coupled to the base part, or vice versa, both constituting a ball joint arrangement. A slide element is slidingly engaged between the ball portion and the collar portion in such a way that it restrains movement of the collar portion relative to the ball portion,
(Continued)

resulting from movement the mirror support relative to the base part, wherein the slide element is a spring ring slidingly abutting on contact surfaces of the ball portion and coupled to the collar portion.

17 Claims, 3 Drawing Sheets

(51) Int. Cl.
  *B60R 1/06* (2006.01)
  *B60R 1/066* (2006.01)
  *B60R 1/068* (2006.01)
  *F16F 1/12* (2006.01)
(52) U.S. Cl.
  CPC .............. *B60R 1/068* (2013.01); *F16F 1/12* (2013.01); *F16F 1/128* (2013.01)
(58) Field of Classification Search
  CPC .......... B60R 1/066; B60R 1/068; B60R 1/07; B60R 1/072; B60R 1/074; B60R 1/076; B60R 1/078; F16F 1/12; F16F 1/128
  USPC .................................................. 359/841, 871
  See application file for complete search history.

(56) References Cited

U.S. PATENT DOCUMENTS

| | | | |
|---|---|---|---|
| 4,973,145 A | 11/1990 | Kirkwood | |
| 4,973,820 A | 11/1990 | Mittlehaeuser | |
| 5,196,965 A | 3/1993 | Lang | |
| 5,315,890 A | 5/1994 | Long | |
| 5,529,277 A * | 6/1996 | Ostaszewski | F16C 11/12 248/398 |
| 5,568,326 A | 10/1996 | Yoshida | |
| 5,659,423 A | 8/1997 | Schierbeek | |
| 5,943,176 A | 8/1999 | Mertens | |
| 6,409,353 B1 * | 6/2002 | Guttenberger | B60R 1/072 359/838 |
| 6,474,821 B2 | 11/2002 | Schieweck | |
| 7,188,831 B2 | 3/2007 | Coppoolse | |
| 8,016,438 B2 | 9/2011 | Meyer et al. | |
| 8,246,266 B2 * | 8/2012 | Lang | B60R 1/066 359/874 |
| 9,108,573 B2 * | 8/2015 | Bogelein | B60R 1/072 |
| 9,405,090 B2 | 8/2016 | van Stiphout | |
| 2002/0171906 A1 | 11/2002 | Busscher | |
| 2003/0179475 A1 | 9/2003 | Brouwer | |
| 2004/0021965 A1 * | 2/2004 | Wolf | B60R 1/0612 359/877 |
| 2004/0047054 A1 * | 3/2004 | Kikuchi | B60R 1/062 359/877 |
| 2004/0105181 A1 * | 6/2004 | Mendoza Vicioso | B60R 1/02 359/880 |
| 2005/0128612 A1 * | 6/2005 | Ro | B60R 1/072 359/879 |
| 2012/0294028 A1 | 11/2012 | Wainscott | |

FOREIGN PATENT DOCUMENTS

| | | |
|---|---|---|
| CN | 102458924 A | 5/2012 |
| CN | 103358999 | 10/2013 |
| DE | 23 08 272 | 9/1974 |
| DE | 2627918 | 12/1977 |
| DE | 44 00 597 | 7/1995 |
| DE | 199 02 755 A1 | 7/2000 |
| DE | 20 2005 018289 | 1/2006 |
| EP | 0458480 | 11/1991 |
| EP | 1300289 | 4/2003 |
| EP | 1382488 | 1/2004 |
| EP | 2 208 641 | 7/2010 |
| FR | 2 714 638 | 7/1995 |
| JP | U 48-057842 | 7/1973 |
| JP | U 63-109236 | 7/1988 |
| JP | 8 104173 | 4/1996 |
| JP | 2003-312365 | 11/2003 |
| JP | 2005-513376 | 5/2005 |
| WO | WO 02/079002 | 10/2002 |
| WO | WO 2010/056586 | 5/2010 |

OTHER PUBLICATIONS

International Search Report from PCT/NL2013/050517 dated Oct. 9, 2013.
International Search Report from PCT/NL2014/050313 dated Sep. 3, 2014.
International Search Report from PCT/NL2015/050121 dated May 13, 2015.
Office Action and Search Report from CN 2016072201566400 dated Jul. 27, 2016 with English translation.
Office Action from App No. 2015-521567 dated Apr. 25, 2016, English translation only.
Office Action from U.S. Appl. No. 14/413,269 dated Aug. 25, 2015.
Office Action from CN App No. 2015800109539 dated Mar. 5, 2018 and Search Report.
Office Action from JP 2016-554338 dated Jan. 4, 2019 with English translation.

\* cited by examiner

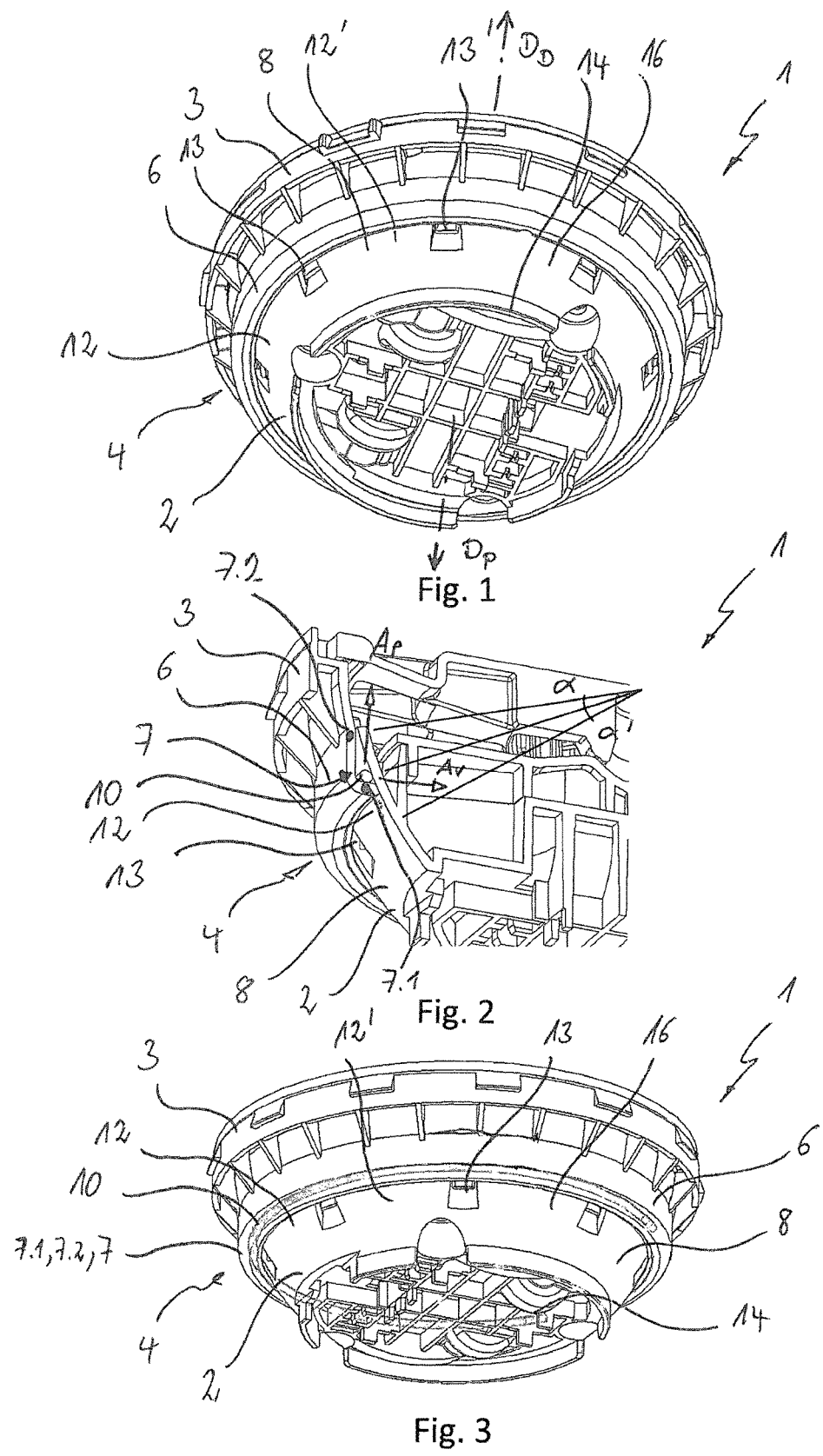

MIRROR ADJUSTMENT MECHANISM, IN PARTICULAR FOR A WING MIRROR FOR A MOTOR VEHICLE

RELATED APPLICATIONS

This application is a 35 U.S.C. § 371 national phase application of PCT/NL2015/050121 (WO 2015/130170), filed on Feb. 27, 2015, entitled "Mirror Adjustment Mechanism, in Particular for a Wing Mirror for a Motor Vehicle", which application claims priority to Netherlands Application No. 2012333, filed Feb. 28, 2014, each of which is incorporated herein by reference in its entirety.

The invention relates to a mirror adjustment mechanism according to the introductory portion of claim 1 and a wing mirror unit for a motor vehicle according to the introductory portion of claim 17. In detail the invention relates to a mirror adjustment mechanism, in particular for a wing mirror for a motor vehicle, having a base part with a mirror support arranged pivotally relative thereto, wherein between the base part and the mirror support a damping means is arranged, comprising a collar portion, coupled to the mirror support, encompassing a ball portion, coupled to the base portion, or vice versa, both constituting a ball joint arrangement.

Such a mirror adjustment mechanism is well known. The pivotable arrangement of the mirror support relative to the base part makes it possible to adjust a mirror element coupled with the mirror support relative to the base part. The damping means prevents vibrations of the mirror element relative to the base part. Especially at higher speeds and with mirror elements having relatively high weights, such vibrations can become strongly manifest.

In the known mirror adjustment mechanism, the damping means is provided as a damping spring constructed as a resilient flap, injection molded integrally with the actuator housing, which cooperates with the inner surface of an annular flange injection molded integrally with the mirror support. Other systems are known where the respective parts are provided vice versa. In another mirror adjustment mechanism, the damping spring is constructed as a spring leg integrally injection molded with the mirror support, which cooperates with the inner side of the mirror cap.

An advantage of a plastic damping spring that cooperates with a plastic contact track is the good damping of vibrations.

However, a disadvantage is that the spring force of the plastic damping spring is not constant. For instance, the spring force decreases over time as a result of relaxation of the plastic material. Relaxation is the phenomenon that in a deformed plastic part, given equal loading, the internal stresses become lower over time, and that as a result the force exerted by the deformed part on its environment also becomes smaller. Also, the spring force of the plastic material is considerably lower at high temperatures.

In view of this, in practice, the mirror adjustment mechanism is provided with a relatively high initial spring force. This makes assembly more difficult and requires a relatively heavy construction. When the mirror adjustment mechanism is provided with an electrical drive, the high initial clamping force necessitates the use of relatively heavy-duty and costly electric motors to overcome the rather high moments of friction connected with the relatively high clamping force.

Further it is known that due to the construction of the base part and the mirror support pivotally arranged relative to each other play is provided especially between the base part and the mirror support and between the portions of the damping means which under certain circumstances and especially when a user presses against the mirror attached to the mirror support, causes a wobbly and low quality impression.

From DE 20 2005 018 289 a mirror adjustment mechanism is known comprising a damping means with a damping spring enforced by an auxiliary spring, wherein this auxiliary spring is provided as a bending rod or a band spring arranged at the mirror support forcing a damping spring member against a damping spring counter member. The auxiliary spring is thereby received in complex bearing means. Such an arrangement is elaborately to assemble.

The object of the invention is to provide a mirror adjustment mechanism of the type mentioned in the introductory portion, in which the above disadvantages can be prevented while preserving the above advantages. To that end, the invention provides a mirror adjustment mechanism according to claim 1 and a wing mirror unit for a motor vehicle according to claim 17.

The invention especially relates to a mirror adjustment mechanism, in particular for a wing mirror for a motor vehicle, having a base part with a mirror support arranged pivotally relative thereto, wherein between the base part and the mirror support a damping means is arranged, comprising a collar portion, coupled to the mirror support, encompassing a ball portion, coupled to the base part, or vice versa, both constituting a ball joint arrangement, wherein a slide element slidingly engaged between the ball portion and the collar portion in such a way that it restrains movement of the collar portion relative to the ball portion, resulting from movement the mirror support relative to the base part, wherein the slide element is a spring ring slidingly abutting on contact surfaces of the ball portion and coupled to the collar portion.

By the use of the above arrangement the base part and the mirror support, whilst preserving the good damping properties, can be placed under relative action in a durable, very effective and reliable manner, wherein due to the arrangement of the spring ring slidingly abutting on contact surfaces of the ball portion and coupled to the collar portion a more reliable and more easy to assemble mirror adjustment mechanism can be provided. Further, and with regard to known systems from the art, as a consequence, the initial spring force can be chosen to be considerably lower, so that assembly can be facilitated, the construction can be made of lighter design, and any electric motors can likewise be made of lighter design.

Using a slide element constructed as a spring ring which is slidingly abutting on contact surfaces of the ball portion and which is further coupled to the collar portion provides a damping means which eliminates vibrations and especially high frequency vibrations the mirror adjustment mechanism is subjected to especially during use, wherein further an assembly is provided which can without difficulty be assembled comprising easy to manufacture parts.

In the light of the invention preferably a ball joint arrangement is an arrangement where the outer collar portion encompasses the inner ball portion in such a way that the two portions are pivotably connected to each other, but non-detachably coupled in at least one direction and/or axis, under the impact of normal forces, occurring during use of the mirror adjustment mechanism. This axis is here the connection axis between the ball portion and the collar portion.

The ball portion could be every portion comprising contact surfaces arranged complementary to the collar portion so that the above pivotable arrangement in combination with the coupling in at least one direction and/or axis is provided. One embodiment of such a ball portion could for example be a cup- or spherical-shaped body, wherein this body can comprise distinct and separated contact surfaces or comprise one or more consistent contact surfaces, the surfaces preferably extending along the ball portion and especially along its outer surfaces. It is also possible to provide such a ball portion only by an annular or similar curved or spherical arrangement of contact surfaces and similar surfaces, which are preferably distant from each other and which are preferably separated by recesses, even or uneven elements etc. The same applies to a collar portion, which could comprise collar elements and preferably flaps arranged consistent around the collar portion or distinct and separated from each other.

Preferably the spring ring is constructed as a separate part, and preferably a separate part which is detachably mounted to the mirror adjustment mechanism. This enables the use of a specific spring rings dependent on the mirror mounted to the mirror support, the intended use of the mirror, the forces acting on the mirror adjustment mechanism etc. By use of a specific spring ring the mirror adjustment mechanism can be easily adapted to the respective needs.

Preferably the spring ring is coupled and arranged in such a way that it slides along the contact surfaces of the ball portion when the mirror support is pivoted relative to the base part. As the spring ring is abutting on the contact surfaces of the ball portion, friction forces are interacting between the spring ring and the contact surfaces. If the spring ring slides along the contact surfaces of the ball portion, when the mirror support is pivoted relative to the base part, these friction forces have to be overcome, thereby hindering movement of the ball portion relative to the collar portion resulting in damping of movement between the two portions and further between the base part and the mirror support. Beside these damping abilities pivoting of the mirror support relative to the base part is possible, thereby overcoming the friction forces i.a. applied by the spring ring.

Dependent on the geometric form and arrangement of the contact surfaces arranged at the ball portion, beside the above friction forces also bending forces are acting on the spring ring during the relative movement of the base part and the mirror support, resulting in additional forces and in detail spring forces to be overcome while moving the mirror support relative to the base part.

Preferably the collar portion is coupled to the spring ring in such a way that it has no direct contact to the ball portion and preferably to the contact surfaces. In other words, the collar portion and preferably an attachment area, the area the spring ring is coupled to the collar portion, is distant from the ball portion. Therefore damping and pivoting hindering abilities of the mirror adjustment mechanism are dependent on the spring ring features and not on the collar portion arrangement. Therefore these abilities are easy to adjust. Furthermore, assembly of the damping spring and the base part and the mirror support respectively is easily possible.

Preferably the collar portion is arranged and coupled to the spring ring in such a way that it forces at least part of the slide element against the contact surface of the ball portion. This i.a. results in increased friction forces acting on the contact surface and therefore in an increased damping ability. Furthermore by adjusting the force acting from the collar portion via the spring ring on the ball portion, the initial spring force can be easily chosen and adapted dependent on the respective needs.

Preferably the ball portion at least partly comprises a cup or similar spherical shape, with a base portion facing in a proximal direction away from the collar portion and at least one inclined or similar curved side wall comprising at least one contact surface and extending in an opposite direction, namely a distal direction. Preferably the cup-shaped or similar spherical-shaped ball portion is abutting and/or attached to the base part or the mirror support, respectively, via its base portion. Such a base portion could be any portion where the inclined or similar curved side walls are attached or connected to. Having in mind the respectively arranged ball portion, the collar portion is preferably constructed in a complementary way, at least partly encompassing the cup-shaped or spherical-shaped ball portion and preferably in such a way that the ball portion could be pivoted relative to the collar portion, however being coupled to the collar portion in at least one axial direction and/or axis.

Preferably the ball portion broadens in its distal direction and preferably in the area of its contact surfaces and more preferably in the area where the collar portion encompasses the ball portion. Broadening preferably means that planes extending perpendicular to the distal direction and defined by the respective parts of the contact surfaces increase along said distal direction.

Preferably the spring ring is attached onto the ball portion abutting to the contact surfaces and coupled with the collar element in such a pretensioned way that it forces the ball portion and the collar portion against its each other. For example, if a spring ring is attached on inclined contact surfaces in a pretensioned way, e.g. if its ring diameter is elastically increased, the spring ring tries to slide along these inclined contact surfaces, thereby reducing the pretension and decreasing its diameter, respectively. This also applies if the contact surfaces are not simply inclined, but curved or similarly arranged.

Preferably the spring ring is attached to the ball portion abutting the contact surfaces in a pretensioned way resulting in an increased ring diameter when the base part and the mirror support are arranged in a neutral position without pivotation relative to each other. With this embodiment the two portions are pretensioned relative to each other even in a neutral position. This results in a sufficient and reliable damping and also in elimination of play occurring between the two portions and between the base part and the mirror support.

Preferably the contact surface is arranged in such a way that during a pivotation of the mirror support relative to the base part of basically ±15°, preferably basically ±12.5°, the spring ring abuts against at least one of the contact surfaces. During this pivotation the spring ring and its respective abutment portions of the spring ring slide along the contact surfaces corresponding to the ±15°, preferably basically ±12.5° pivotation.

Preferably the contact surface comprises a constant curvature in an area the slide ring slides along during a pivotation of the mirror support relative to the base part of basically ±15°, preferably basically ±12.5°. In other words the contact surface comprises a constant curvature at least along a length the spring ring and its respective abutment portions travel along the contact surfaces during the pivotation.

Preferably the spring ring is constructed in such a way that its ring diameter can be elastically increased. This could be achieved for example by manufacturing the spring ring as an elastically open ring element, wherein for increasing the diameter of the open ring element the free ends of the open ring element have to be forced away from each other. However, this could also be achieved when manufacturing the spring ring as an element, flexibly prolongable along its longitudinal axis. Such an arrangement could for example be a spring ring made from a helical or coil spring, respectively. Such an arrangement could also be achieved by using an elastic material for manufacturing the spring ring. Preferably and especially if the spring ring is constructed as an open ring element, its material is made from a metal and preferably from spring steel.

The spring ring can also be manufactured from elastomeric material, for instance natural rubber or thermoplastic rubber, e.g. as an elastically rubber or similar ring element.

Especially when the spring ring is manufactured from thermoplastic elastomeric material, it can be efficiently manufactured by means of so-called two-component injection molding.

When the mirror adjustment mechanism is provided with several damping springs, these too, of course, can be placed under the action of one or more spring rings.

Preferably the spring ring abuts against the ball portion with distinct abutment portions preferably formed as projections or similar embossments. These abutment portions reduce the contact areas of the spring ring and therefore reduce the impact moisture, temperature and dirt has on the mirror adjustment mechanism. The abutment portions could for example be defined by projections of the spring ring, wherein these projections are e.g. respective bendings of the spring ring. It is also possible to provide respective projections by integrally attaching additional material to the spring ring, for example respective thickenings, or attaching respective abutment elements, which are for example clamped or similar attached and preferably detachably attached to the spring ring. Here e.g. separate thickening elements or similar projection elements could be attached to the spring ring.

Preferably the spring ring is arranged at and/or attached to the collar portion, wherein the collar portion has recesses or similar openings the spring ring extends through for abutting on the ball portion and preferably extends through with abutment portions preferably formed as projections or similar embossments as mentioned before.

The invention also relates to a wing mirror unit for a motor vehicle, comprising a mirror cap provided with a mirror adjustment mechanism according to any of the before mentioned embodiments, and a mirror unit coupled with the mirror support of the mirror adjustment mechanism.

Further advantageous embodiments of the invention are set forth in the sub claims.

The invention will be elucidated on the basis of two exemplary embodiments which are represented in the drawings.

In the drawing:

FIG. 1 shows a schematic perspective view of a first embodiment of the mirror adjustment mechanism, FIG. 2 shows a schematic perspective cross-section of the embodiment of FIG. 1;

FIG. 3 shows another schematic perspective view of the embodiment of FIG. 1;

Figure 4:
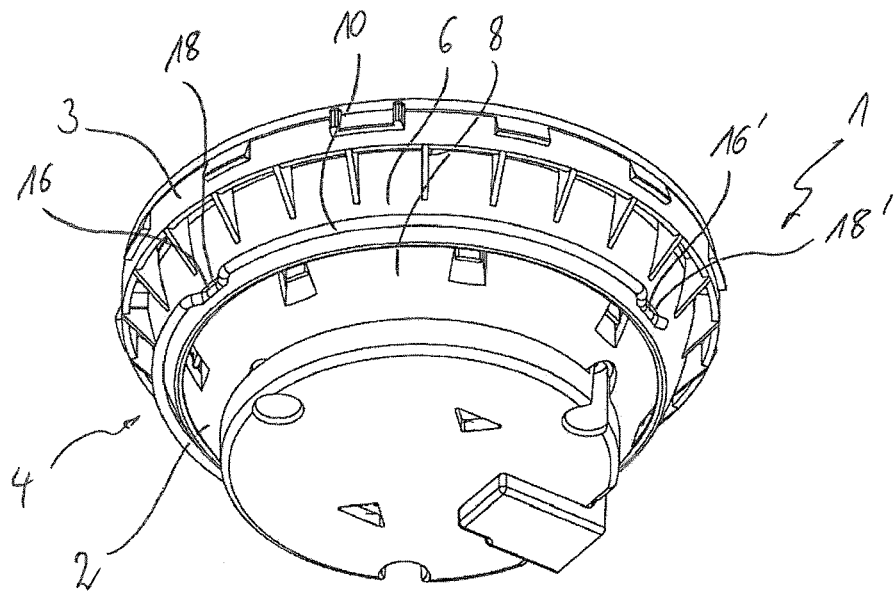
FIG. 4 shows a schematic perspective view of a second embodiment of the mirror adjustment mechanism.

It is noted that the figures are only schematic representations of advantageous embodiments of the invention, which are given by way of non-limiting exemplary embodiments. In the figures, the same or corresponding parts are designated with the same reference numerals, wherein high indices may be used.

FIGS. 1-3 show a mirror adjustment mechanism 1 for a wing mirror for a motor vehicle. The mirror adjustment mechanism 1 comprises a base part 2 with a mirror support 3 arranged pivotably relative thereto. In this embodiment, the pivotable arrangement is realized by means of a cross piece, not shown, with which a cardan joint between base part 2 and mirror support 3 is realized. The crosspiece can pivot about a first axis, for instance the x-axis, relative to the base part 2. The mirror support 3 is subsequently pivotable about a second axis, for instance the y-axis, connected with the cross piece. This manner of connecting the base part 2, which is here formed by the actuator housing, is generally known and is used inter alia in the product Mirror Actuator model 960 of Eaton Automotive B.V. and is described more in detail in the Dutch patent application 7905806.

Arranged between the base part 2 and the mirror support 3 is a damping means 4. In this exemplary embodiment, the damping means comprises a collar portion 6, which is coupled to the mirror support 3 and which encompasses a ball portion 8, wherein said ball portion 8 is coupled to the base part 2. Of course, this arrangement could be provided vice versa, which means that the collar portion is coupled to the base part and the ball portion is coupled to the mirror support, respectively.

The coupling of the before mentioned portions 6, 8 to the mirror support 3 and the base part 2, respectively, could be provided in multiple ways, e.g. as an integral connection, a detachable connection or as an assembly detachable or non-detachable etc.

The collar portion 6 encompasses the ball portion 8 in such a way that they both constitute a ball joint arrangement. This means that the two portions 6, 8 are pivotably arranged relative to each other. Starting from a non-pivoted state, which is a neutral state as shown in FIGS. 1 to 3, the relative pivoting of the two portions 6, 8 is ±15° and preferably ±12.5° as indicated by reference sign $\alpha$ in FIG. 2.

As can be seen with FIGS. 2 and 3, a slide element 10 is slidingly engaged between the ball portion 8 and the collar portion 6 in such a way that it restrains movement of the collar portion 6 relative to the ball portion 8, resulting from movement of the mirror support 3 relative to the base part 2, wherein the slide element 10 is a spring ring 10 slidingly abutting on contact surfaces 12 of the ball portion 8 and which is further coupled to the collar portion 6.

As can be seen in FIG. 2, the spring ring 10 is constructed as a separate part, preferably a separate part which is detachably mounted. This is also depicted in FIG. 3, wherein here all related parts of the adjustment mechanism except for the spring ring 10 are drawn translucent to enable a perspective view of the spring ring 10.

As further can be seen with FIG. 2, the spring ring 10 is coupled and arranged in such a way that it slides along the contact surfaces 12 of the ball portion 8, when the mirror support 3 is pivoted relative to the base part 2 (resulting in a deflection±$\alpha$). Here the respective contact surfaces 12 are arranged distinct from each other separated by recess portions 13. These recess portions 13 are here used for assembling the different parts of the base part 2.

Further it can be seen that in this particular embodiment the collar portion 6 is preferably coupled to the spring ring 10 in such a way that it has no direct contact to the ball portion 8 and furthermore no direct contact to the respective contact surfaces 12. That means that the collar portion 6 is distant from the ball portion 8 and the contact surfaces 12, respectively, especially in the area where the spring ring 10 is arranged.

The collar portion 6 is preferably arranged and coupled to the spring ring 10 in such a way that it forces at least part of the spring ring 10 against the contact surfaces 12 of the ball portion 8. Here the collar portion 6 forces the spring ring 10 against the contact surfaces of the ball portion in two axis, namely along an axis $A_P$ parallel to a distal direction $D_D$ and along an axis $A_V$ vertical to said direction $D_D$ (see FIGS. 1 and 2).

In this particular embodiment the collar portion 8 preferably has at least one hook or similar coupling element 7 by which it is detachably hooked or similarly coupled to the spring ring 10. Preferably said hook element 7 comprises a first flank 7.1 hooking against the spring ring 10 in such a way that when the collar portion 6 is forced relative to the base part 2 in a distal direction $D_D$ (i.e. forced away from the base portion, see FIG. 1) a force is initiated on the spring ring 10 also acting in this distal direction $D_D$. Further the hook element 7 comprises a second flank 7.2 which is arranged in such a way that it forces at least part of the spring ring 10 against the contact surfaces 12 of the ball portion in a direction perpendicular to the before mentioned distal direction $D_D$.

As can be seen in FIGS. 1 to 3, the corresponding contact surfaces 12 of the ball portion 8 are inclined relative to this distal direction $D_D$ so that the before mentioned forces initiated by the first flank 7.1 and the second flank 7.2 result in an elastic deflection of the spring ring 10 increasing its ring diameter $d_R$ (see FIG. 7) against the spring forces of the spring 10.

Due to the above the spring ring 10 attached to the ball portion 8 and its contact surfaces 12 restrains movement of the collar portion 6 relative to the ball portion 8. This means that if the mirror support 3 is pivoted relative to the base part 2, the resulting movement in the damping spring 4, namely the movement of the collar portion 6 and the ball portion 8, is restrained. This applies to deflections resulting for example from the adaption of a mirror angle, but also from vibrations and micro vibrations the mirror adjustment mechanism is subjected to, for example during car driving etc.

With this embodiment the ball portion 8 comprises a cup or similar spherical shape, wherein a base portion 14 of this cup shape is facing in a proximal direction $D_P$ (see FIG. 1), i.e. away from the collar portion 6, and wherein at least one inclined or similarly curved side wall 16 which comprises the contact surfaces 12 is extending in an opposite direction, namely in the distal direction $D_D$. The ball portion 8 with this embodiment broadens in its distal direction $D_D$ and preferably in the area of its contact surfaces 12 and more preferably in the area where the collar portion 6 encompasses the ball portion 8.

In general and especially because of this cup-shaped arrangement of the ball portion 8 the spring ring 10 is preferably attached onto the ball portion 8 abutting to the contact surfaces 12 and coupled with the collar element 6 in such a pretensioned way that it forces the ball portion 8 and the collar portion 6 against each other.

Further the spring ring 10 is preferably attached to the ball portion 8 abutting the contact surfaces 12 in a pretensioned way, which is resulting in an increased ring diameter of the spring ring 10. With this embodiment this is the case especially when the base part 2 and the mirror support 3 are arranged in a neutral position without pivotation relative to each other ($\alpha$=0, see FIG. 2). Because of said pretensioning, play between the base part 2 and the mirror support 3 is reliably limited. Due to the arrangement of the inclined or curved contact surfaces 12 and the abutting spring ring 10 coupled to the collar portion 6, the base part 2 and the mirror support 3 are prestressed against each other, wherein especially by use of a respective counter bearings (not shown) a snug fit of the two parts 2, 3 is guaranteed.

Especially when a user presses against the mirror support 3 or a mirror attached to it and especially in the proximal direction $D_P$ (see FIG. 1), for example if he tries to adapt the mirror angle, no play occurs, despite an easy and smooth pivotability between the base part 2 and the mirror support 3.

As can be seen in FIG. 2, the base part 2 and the mirror support 3 are arranged relative to each other in a neutral position, where a pivotation angle a is zero. The contact surfaces 12 are, however, arranged in such a way that during a pivotation of the mirror support 3 relative to the base part 2 of basically $\alpha=\pm15°$ and preferably basically 12.5° the spring ring 10 preferably continuously abuts against at least one of the contact surfaces 12 and in detail slides along the same. In more detail here the contact surfaces 12 preferably comprise a constant curvature in an area the spring ring 10 slides along during the before mentioned pivotation of the mirror support 3 relative to the base part 2 of basically $\pm15°$, preferably basically 12.5°.

With regard to the abutment of the spring ring 10 to the contact surfaces 12 it can be seen especially in FIGS. 1 and 3 that the spring ring only abuts to the ball portion 8 in individual contact surfaces 12 which are separated from each other by the recesses 13. Here all different separation elements known from the art could be used for separation of the contact surfaces. Furthermore, the punctual abutment of the spring ring 12 in multiple abutment portions (this are the portions in contact with the contact surfaces 12) furthermore guarantees a smooth sliding along the ball portion 8 and its contact surfaces 12.

By reducing the abutment areas were the spring ring 10 abuts against the ball portion 8, i.a. impact on the friction forces due to moisture, temperature and dirt entering the adjustment mechanism can be reduced. Therefore preferably the spring ring 10 comprises distinct abutment portions which are preferably formed as projections or similar embossments, wherein of course it is also possible that these abutment portions are generated by the separation of multiple distinct contact surfaces on the ball portion 8 as shown in FIGS. 1 to 3.

With this embodiment the spring ring 10 is constructed in such a way that its ring diameter can be elastically increased. In more detail the spring ring 10 is preferably manufactured from metal and here from spring steel and furthermore as an elastically open ring element. Instead of such an open ring element also a spring ring 10 could be used which is constructed as an element, flexibly prolongable along its longitudinal axis, and preferably as a closed ring element. Such a spring ring 10 could for example be a spring ring made from a helical or coil spring or having a zigzag arrangement constructed from an elastic material. Different embodiments of the spring ring 10 are going to be explained further below.

Figure 5:
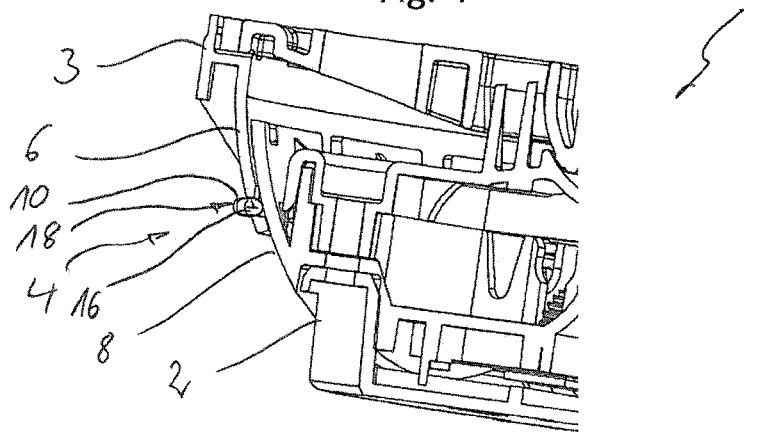
FIG. 5 shows a schematic perspective cross-section of the embodiment of FIG. 4.
Figure 6:
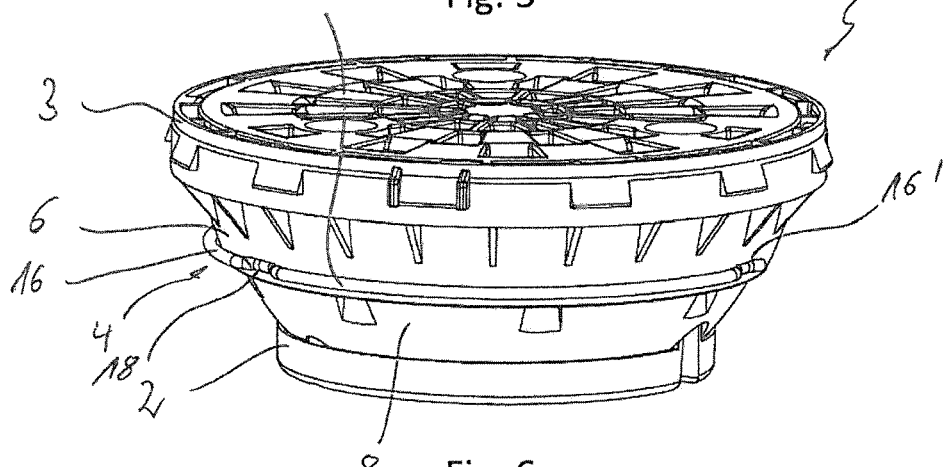
FIG. 6 shows another schematic perspective view of the embodiment of FIG. 4.

FIGS. 4 to 6 disclose a second embodiment of the mirror adjustment mechanism 1 in principle comprising the same parts as the first embodiment described before. Again a base part 2 is pivotally arranged relative to a mirror support 3, wherein between the base part 2 and the mirror support 3 a damping means 4 is arranged comprising a collar portion 6 coupled to the mirror support 3, encompassing a ball portion 8, coupled to the base part 2. Again this arrangement could be provided vice versa. Further a slide element 10 is slidingly engaged between the ball portion 8 and the collar portion 6 in such a way that it restrains movement of the collar portion 6 relative to the ball portion 8 resulting from movement of the mirror support 3 relative to the base part 2, wherein the slide element is a spring ring 10 slidingly abutting on contact surfaces 12 of the ball portion 8 and coupled to the collar portion 6. Therefore, all the before mentioned features of first embodiment are also applicable to said second embodiment of a mirror adjustment mechanism and are not mentioned here for redundancy reasons.

However, as can be seen in FIGS. 4 to 5, the spring ring 10 is here abutting against the ball portion 8 and respective contact surfaces 12 with distinct abutment portions 16 which are here preferably formed as projections or similar embossments. These abutment portions 16 are extending through recesses or similar openings 18 provided in the collar portion 6.

In detail with this embodiment the spring ring 10 is attached on the outside of the collar portion 6, i.e. on the outer side of flap elements arranged at the collar portions, extending through the recesses 18 in the collar portion 6 in such a way that the abutment portions 16 are abutting against the contact surfaces 12. By such an arrangement the spring ring 10 is reliably positioned and the adjustment mechanism 1 easy to assemble. Furthermore, due to the reduction of the contact areas, i.e. the areas where the spring ring 10 abuts against the contact surfaces 12 of the ball portion 8, impact of moisture, dirt and temperature can be reduced.

FIGS. 7 to 10 are schematically showing different embodiments of the spring ring 10.

Figure 7:
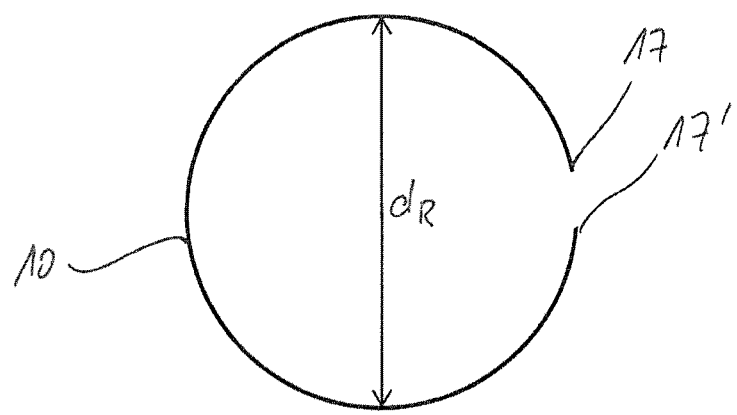
FIGS. 7 to 10 show different embodiments of the spring ring.

FIG. 7 discloses one embodiment where the spring ring 10 is provided as an open ring element having free endings 17, wherein the spring ring 10 is made from an elastic material and preferably from spring steel. By bending the free endings 17 away from each other the diameter $d_R$ of the spring ring 10 can be increased thereby pretensioning the spring ring. Such a spring ring 10 is e.g. provided with the embodiment shown with FIGS. 1 to 3.

Figure 8:
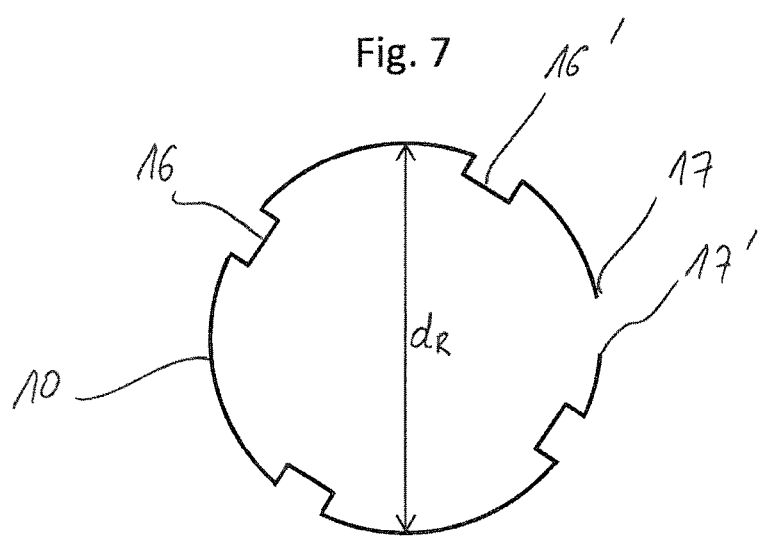

FIG. 8 discloses a further embodiment of the spring ring 10 provided with the abutment portions 16, as explained with regard to the second embodiment of FIGS. 4 to 6. Also this spring ring 10 is constructed as an open ring element which diameter $d_R$ could be elastically increased and/or reduced.

Figure 9:
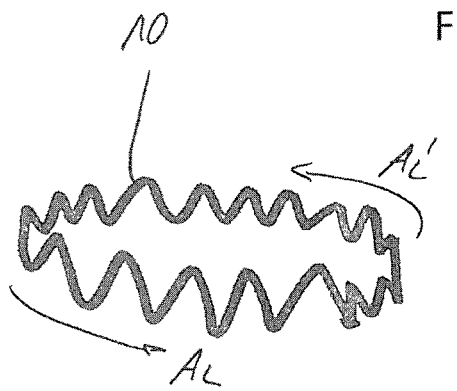

FIG. 9 discloses a spring ring 10 which is provided as a closed ring element comprising zigzag or similar bended portions which could be deflected and/or stretched even along the longitudinal axis of the spring ring 10, shown with reference signs $A_L$. Such a spring ring 10 is preferably manufactured from metal or a similar flexible plastic and preferably from spring steel.

Figure 10:
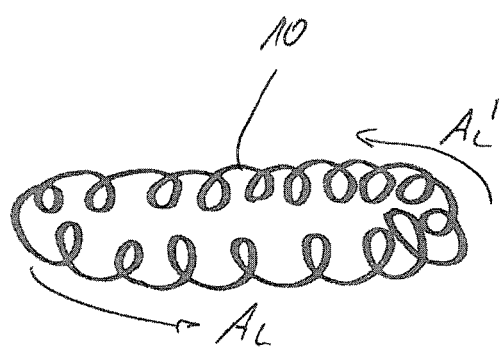

A similar embodiment is disclosed with FIG. 10, wherein the spring ring 10 is provided as a coil spring ring element which diameter can be increased by elongation the ring along the longitudinal axis $A_L$.

A closed spring ring can also be constructed from an elastic material and preferably from a material which is flexibly prolongable along its longitudinal axis, preferably from a thermoplastic rubber. With this embodiment the above bended portions can be omitted.

It will be clear that the invention is not limited to the exemplary embodiment described here. Many variations are possible. Thus, one or more damping springs can extend between the mirror support and the mirror cap, and the pivotable arrangement of the mirror support can for instance be realized by means of a ball hinge or a cup hinge.

Such variants will be clear to those skilled in the art and are understood to fall within the scope of the invention as set forth in the following claims.

In this description words like "substantially", "about" or "generally" are preferably to be interpreted as meaning at least including deviations of a dimension of 10% or less, preferably 5% or less or deviations from a shape of form which would still be considered by a person skilled in the art as falling with the definition referred to.

Although illustrative embodiments of the present invention have been described above, in part with reference to the accompanying drawings, it is to be understood that the invention is not limited to these embodiments. Variations to the disclosed embodiments can be understood and effected by those skilled in the art in practicing the claimed invention, from a study of the drawings, the disclosure, and the appended claims Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, it is noted that particular features, structures, or characteristics of one or more embodiments may be combined in any suitable manner to form new, not explicitly described embodiments. The word 'comprising' does not exclude the presence of other features or steps then those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

The invention claimed is:

1. A mirror adjustment mechanism, in particular for a wing mirror for a motor vehicle, having a base part with a mirror support arranged pivotally relative thereto, wherein
   between the base part and the minor support a damping means is arranged, the damping means comprising:
   a collar portion, coupled to the mirror support or the base part and encompassing a langball portion coupled to the other of the base part or the mirror support respectively, both constituting a ball joint arrangement:
   a slide element slidingly engaging the ball portion and the collar portion in such a way that it restricts movement of the collar portion relative to the ball portion when the minor support is moved relative to the base part, wherein
   the slide element is an elastic spring ring slidingly abutting on contact surfaces of the ball portion, coupled to the collar portion, and being attached onto the ball portion abutting to the contact surfaces and coupled with the collar portion in such a pretensioned way that the spring ring forces the ball portion and the collar portion against each other.

2. The minor adjustment mechanism according to claim 1, wherein the spring ring is coupled and arranged in such way that it slides along the contact surfaces of the ball portion, when the minor support is pivoted relative to the base part.

3. The minor adjustment mechanism according to claim 1, wherein the collar portion is coupled to the spring ring in such a way that the collar portion has no direct contact to the ball portion.

4. The minor adjustment mechanism according to claim 1, wherein the collar portion is arranged and coupled to the spring ring in such a way that it forces at least part of the slide element against the contact surfaces of the ball portion.

5. The mirror adjustment mechanism according to claim 1, wherein the ball portion at least partly has a spherical shape, with a base portion facing in a direction away from the collar portion and at least one curved side wall comprising at least one contact surface and extending in an opposite direction.

6. The mirror adjustment mechanism according to claim 1, wherein the ball portion broadens in a direction away from the collar portion.

7. The mirror adjustment mechanism according to claim 1 wherein the collar portion has coupling element by which it is detachably coupled to the spring ring.

8. The mirror adjustment mechanism according to claim 1, wherein the spring ring is attached to the ball portion in a pre-tensioned manner having a stretched diameter abutting the contact surfaces in a pretensioned way when the base part and the mirror support are arranged in a neutral position without pivotation relative to each other.

9. The mirror adjustment mechanism according to claim 1, wherein the contact surfaces are arranged in such a way that during a pivotation of the mirror support relative to the base part of ±15° out of a neutral position, the spring ring abuts against at least one of the contact surfaces.

10. The mirror adjustment mechanism according to claim 1, wherein the contact surfaces comprise a constant curvature in area the slide ring slides along during a pivotation of the mirror support relative to the base part of ±15° out of a neutral position.

11. The mirror adjustment mechanism according to claim 1, wherein the spring ring is constructed in such a way that its ring diameter can be elastically increased.

12. The mirror adjustment mechanism according to claim 1, wherein the spring ring is manufactured from spring steel.

13. The mirror adjustment mechanism according to claim 1, wherein the spring ring is constructed as an elastically open ring element having free ends which can be elastically forced away from each other.

14. The mirror adjustment mechanism according to claim 1, wherein the spring ring is constructed as an element, flexibly prolongable along a diameter of the spring ring.

15. The mirror adjustment mechanism according to claim 1, wherein the spring ring is abutting against the ball portion with distinct abutment portions formed as embossments at the spring ring.

16. The mirror adjustment mechanism according to claim 1, wherein the spring ring is attached to the collar portion, the collar portion having openings the spring ring extends through for abutting onto the ball portion.

17. A wing mirror unit for a motor vehicle, comprising a mirror cap provided with a mirror adjustment mechanism according to claim 1, and a mirror unit coupled with the mirror support of the mirror adjustment mechanism.

* * * * *

UNITED STATES PATENT AND TRADEMARK OFFICE
CERTIFICATE OF CORRECTION

PATENT NO. : 10,232,777 B2
APPLICATION NO. : 15/117135
DATED : March 19, 2019
INVENTOR(S) : Amee Heleen de Groen et al.

It is certified that error appears in the above-identified patent and that said Letters Patent is hereby corrected as shown below:

In the Claims

Claim 1, Column 10, Line 42, "minor" should be --mirror--.
Claim 1, Column 10, Line 51, "minor" should be --mirror--.
Claim 2, Column 10, Line 60, "minor" should be --mirror--.
Claim 2, Column 10, Line 63, "minor" should be --mirror--.
Claim 3, Column 10, Line 64, "minor" should be --mirror--.
Claim 4, Column 11, Line 1, "minor" should be --mirror--.

Signed and Sealed this
Fourth Day of June, 2019

Andrei Iancu
*Director of the United States Patent and Trademark Office*